(12) United States Patent
Hampel

(10) Patent No.: US 7,530,623 B2
(45) Date of Patent: May 12, 2009

(54) VEHICLE CAB

(76) Inventor: Lance T. Hampel, 5678 W. Big Portage Lake Rd., Land O' Lakes, WI (US) 54540

( * ) Notice: Subject to any disclaimer, the term of this patent is extended or adjusted under 35 U.S.C. 154(b) by 241 days.

(21) Appl. No.: 11/737,353

(22) Filed: Apr. 19, 2007

(65) Prior Publication Data

US 2007/0182205 A1    Aug. 9, 2007

Related U.S. Application Data

(62) Division of application No. 10/971,397, filed on Oct. 22, 2004, now Pat. No. 7,216,926.

(60) Provisional application No. 60/513,267, filed on Oct. 22, 2003.

(51) Int. Cl.
*B60J 5/04* (2006.01)

(52) U.S. Cl. .............................. 296/146.11; 296/146.1; 296/146.9; 296/191

(58) Field of Classification Search .............. 296/146.1, 296/146.5, 146.9, 146.11, 191; 264/138, 264/152, 157, 160; 49/502
See application file for complete search history.

(56) References Cited

U.S. PATENT DOCUMENTS

| | | | |
|---|---|---|---|
| 3,388,944 A | 6/1968 | Crehore | |
| 4,184,712 A * | 1/1980 | Skahill | ................... 296/190.03 |
| 4,221,426 A | 9/1980 | Wardill | |
| 4,917,435 A | 4/1990 | Bonnett et al. | |
| 5,042,395 A | 8/1991 | Wackerle et al. | |
| 5,934,745 A | 8/1999 | Moore et al. | |
| 6,149,228 A * | 11/2000 | O'Neill et al. | ......... 296/190.03 |
| 6,299,244 B1 | 10/2001 | Tarahomi | |
| 6,349,988 B1 | 2/2002 | Foster et al. | |
| 6,408,796 B1 | 6/2002 | Hampel | |
| 6,418,672 B1 * | 7/2002 | Hampel | ...................... 52/79.1 |
| 6,568,746 B2 | 5/2003 | Sakyo et al. | |
| 6,574,025 B2 * | 6/2003 | Whitehead et al. | ........... 359/222 |
| 6,823,639 B2 * | 11/2004 | Hampel | ...................... 52/598 |
| 7,216,926 B2 * | 5/2007 | Hampel | ................ 296/190.08 |

* cited by examiner

*Primary Examiner*—Glenn Dayoan
*Assistant Examiner*—Greg Blankenship
(74) *Attorney, Agent, or Firm*—Quarles & Brady LLP

(57) ABSTRACT

A cab for a vehicle, such as an all terrain vehicle, a tractor, or small construction vehicle, is constructed of twin-sheet plastic panels that can be easily assembled, preferably with snap-together interlocking features. One of the panels can be a door panel having a door hinged to a door frame to control passage through a doorway. Both the door and the door frame have spaced apart hinge knuckles that interleave along a hinge axis to allow the door to pivot about a hinge pin. The door and door frame can be molded in a single twin-sheet panel. The two walls of the panel are fused together along the outer periphery of the panel door portion and the inner periphery of the panel door frame portion. The door is separated from the door frame by cutting the each of the walls along a door perimeter between the door and door frame portions of the molded panel. Preferably, the walls are not fused along the non-hinge sides of the door perimeter so that the walls can be cut in a manner to provide an overlap at the door/door frame interface.

2 Claims, 8 Drawing Sheets

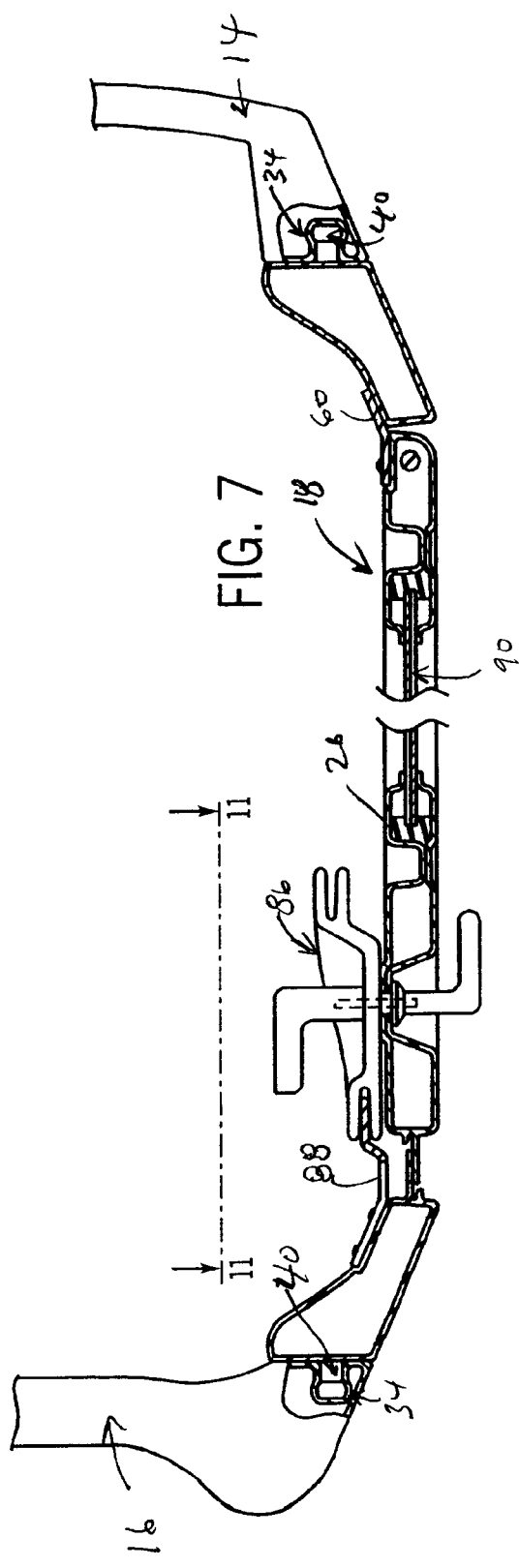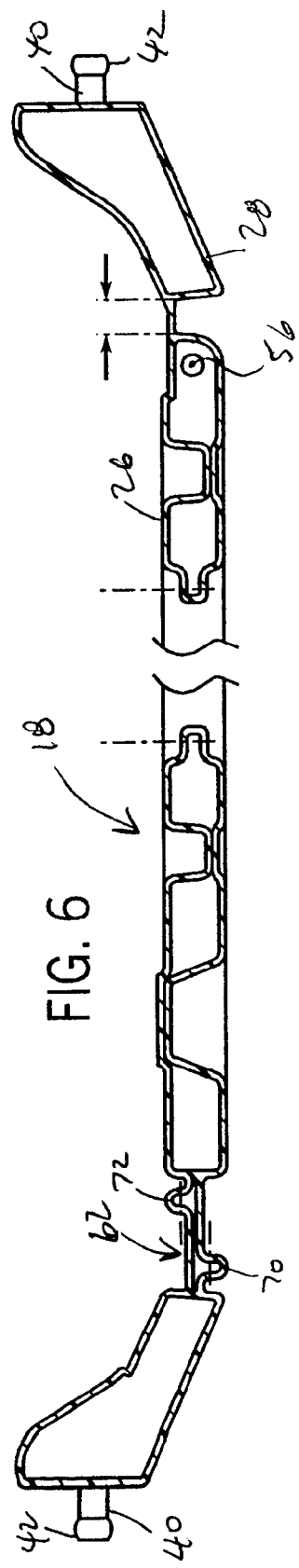

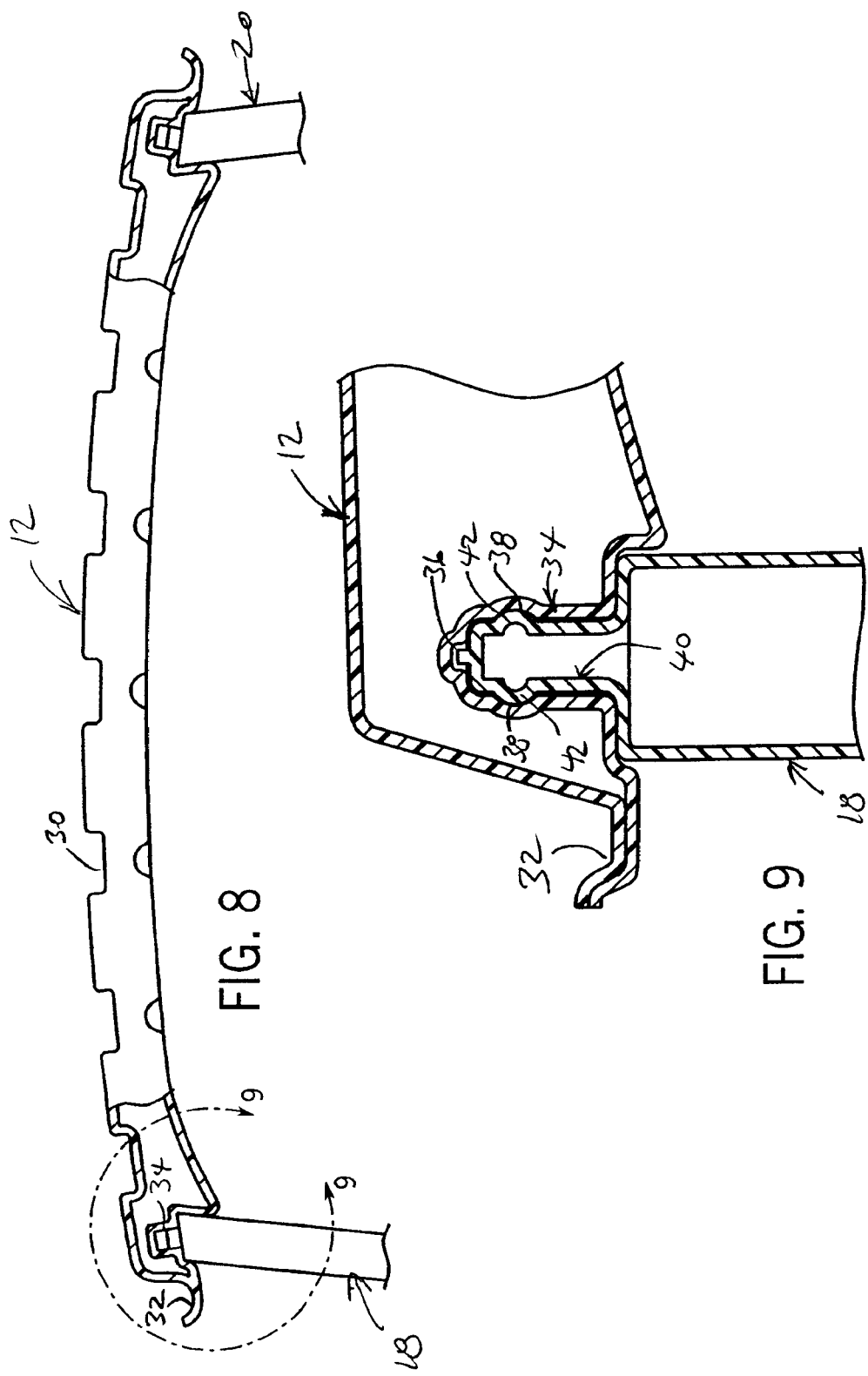

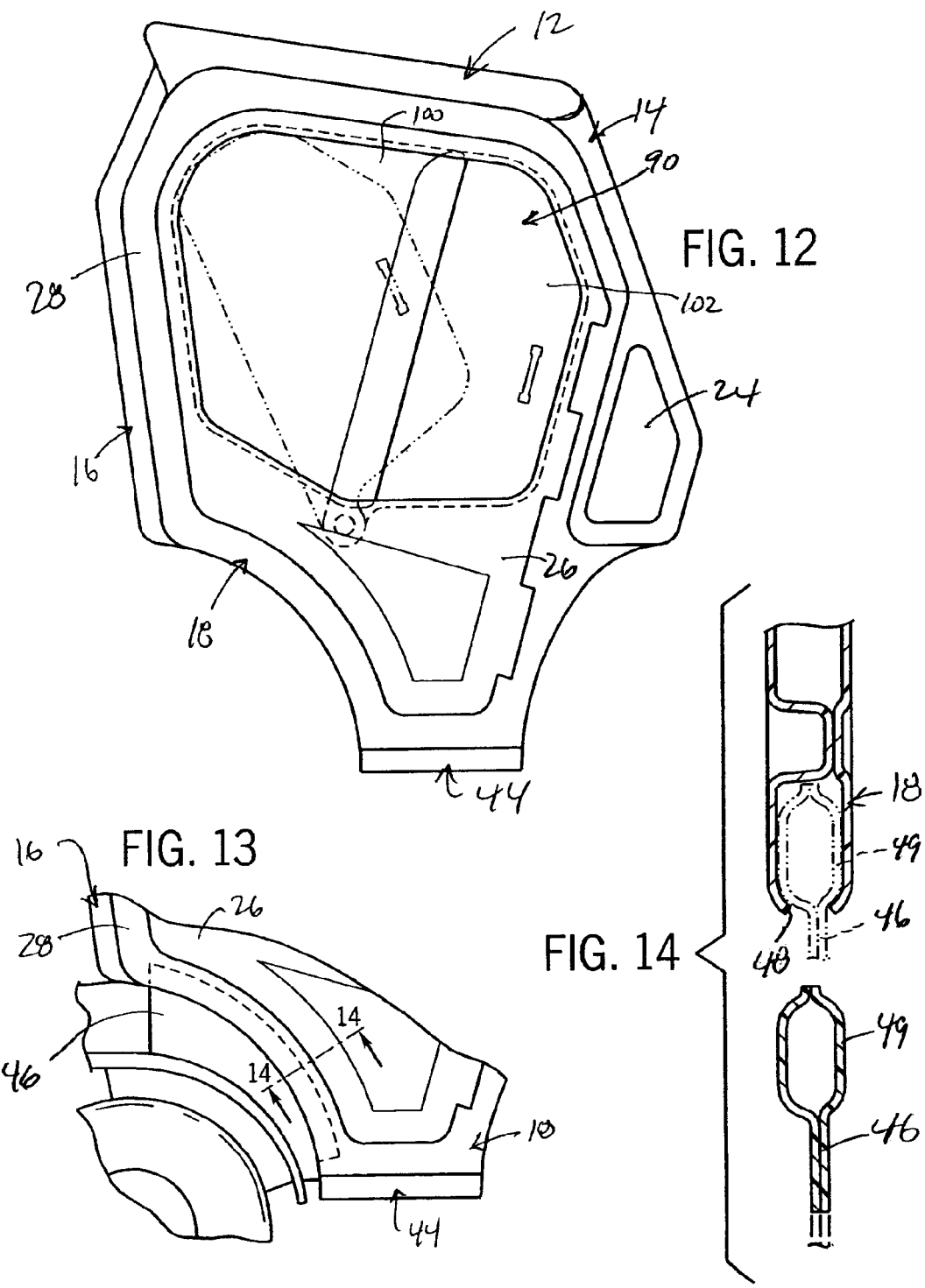

VEHICLE CAB

CROSS-REFERENCE TO RELATED APPLICATION

This application is a divisional of allowed U.S. patent application Ser. No. 10/971,397, filed Oct. 22, 2004 and issued as U.S. Pat. No. 7,216,926 on May 15, 2007, which claims priority to U.S. Provisional Application No. 60/513,267, filed Oct. 22, 2003.

STATEMENT OF FEDERALLY SPONSORED RESEARCH OR DEVELOPMENT

Not applicable.

FIELD OF THE INVENTION

This invention relates to vehicle cabs, and in particular to a cab for a small vehicle like an all terrain vehicle (ATV), a lawn or garden tractor, or small construction equipment.

BACKGROUND OF THE INVENTION

There are many motorized vehicles used for utility or recreation that have no cab such that the rider and any passengers are exposed to the open air and thus subjected to environmental conditions and inclement weather, which are made worse by wind effects from the speed of travel. Lawn maintenance vehicles provide one example of such vehicles. Another typically cab-less motorized vehicle is an ATV. There are approximately 800,000 ATV's sold annually, about half of which are in the utility class, and perhaps 10 or so million of all styles of ATV's in use worldwide. The utility ATV's are used by sportsmen, for hunting and fishing, farmers, ranchers and in the construction and utility industries. Snow removal using an ATV is growing in popularity.

A cab would be a desired addition to such vehicles for many of these applications. The cab would provide protection to the rider from the elements. The cab would allow the rider to sit on the vehicle in a sheltered environment, while performing activities, such as ice fishing, with the vehicle running or off. At the same time the cab should provide ventilation and good visibility.

One concern is to make the cab rugged and durable so that it can withstand impact, from tree branches or rocks common in trail and off-road riding, without being two heavy. Another, concern is to make the cab easy to assemble (if necessary) and to make it easy to install and remove from the vehicle, which is another reason favoring the use of lightweight materials.

Large industrial or commercial equipment, such as some farm or construction vehicles, often have cabs, which are sealed and heated or cooled while the vehicle is operated. However, the cabs in such large vehicles are usually permanently attached to the vehicles, and regardless, they are typically made of heavy duty construction.

Golf carts and the like sometimes have some type of structure designed to protect the riders from the elements. For example, it is common for golf carts to have a plastic or fiberglass roof mounted over the seating area by four metal posts. A transparent panel can be mounted to the front two posts to provide a windshield, however, typically the rear and sides of the cart are open to the elements. Thus, while providing lightweight and perhaps dismountable structures, they are not well suited for the higher speeds of ATVs nor do they provide an enclosed interior for the rider(s).

SUMMARY OF THE INVENTION

The present invention provides a cab for motorized vehicles made of lightweight, but durable plastic panels having a double wall construction. The two walls are primarily spaced apart to give the cab a hollow and thus increased wall thickness providing good structural rigidity and a robust appearance. At certain locations the walls are brought in close relation, and sometimes fused together, to define closed edges or certain structural or working features of the cab.

In one aspect the present invention provides a plastic resin vehicle cab with a roof panel and an upright panel. One of the first and second walls of the roof panel defines an integral connection part that is mateable with an integral connection part defined by one of the walls of the upright panel to connect the roof panel to the upright panel without separate fasteners.

The cab can include several upright panels, which preferably include a front panel, a rear panel and side panels. Each of the front, rear and side panels can have an integral connection part at an upper side to connect to the roof and at each lateral side to connect the side panels to the front panel at the front of the cab and to the rear panel at the rear of the cab.

Each pair of mating connection parts can include a snap-together feature for positively locking the roof to the upright panels and the upright panels to themselves in a snap fit. In one preferred from, the mating connection parts are tongue and groove features and the snap-together features are boss and recess features. The roof panel can be formed with one or more grooves or pockets along its periphery and the front, rear, and side panels each define a tongue or tab extending up from a top edge to fit into the pocket(s). And, each of the front, rear and side panels can have one or more groove or tongue features at each lateral side that complement the mating connection parts of the adjacent panel and allow them to fit together. Preferably, each pocket is formed with a relief channel for accommodating a tip of the associated tongue, which can vary in sized due to slight inconsistency in the molding and/or trimming operations of the manufacturing process.

One of the upright panels can be a door panel having a door hinged to a door frame or jamb. Spaced apart and offset hinge knuckles at hinge sides of the door and door frame are interleaved and aligned in alternating fashion along a hinge axis along which a hinge pin extends to pivotally mount the door.

In thus another aspect of the invention, the door and door frame are preferably formed from a single molded panel. The door can then be cut from the panel and hinged to the door panel. The door is preferably located inside the door frame such that a doorway (bounded by the door frame) is formed after the door is cut out.

At least a portion of the first and second walls of both the door and the door frame portions of the panel are fused together adjacent to a door perimeter, which is located between the door and the frame portions of the panel. Preferably, the first and second walls are fused together along the entire peripheries of the door and door frame portions of the panel adjacent to the door perimeter to define closed edges at the peripheries of each component.

Also, the first and second walls are preferably spaced apart along at least a portion of the door perimeter. For example, the walls can be separated along a free side of the door opposite its hinge side. Then, when the door is cut from the panel one of the walls is cut along the free side of the door further from the hinge side of the door than the other wall so that an overlap is created at the free side when the door is re-assembled to the duo-frame. Preferably, the wall corresponding to the inner side of the panel (at the cab interior) is inside of the outer side wall to act as a stop or door jamb preventing the door from swinging into the cab interior. Such an overlapping configuration can be provided along all non-hinge sides of the door.

The panels of the cab can be molded to fit particular vehicle models. Or, the panels can be of one or more standard sizes for universal cabs that fit multiple sizes and types of vehicles. In the latter case, preferably the upright panels of the cab mount one or more vehicle contour panels that essentially conform to the shape of the vehicle. In one preferred form, the contour panels slip into slots cut into or molded at the bottom edges of the upright panels so that an end of the contour panel(s) fit between the walls of the associated panel(s). Still more preferably, the vehicle contour panel(s) are formed and cut from the molded panel(s) in areas of the panels which would otherwise be waste.

Transparent or translucent materials can also be mounted to one or more of the cab panels. For example, a transparent acrylic panel can be mounted to the front panel to provide a windshield. Or, a translucent or transparent panel can be mounted to the door as a window or to the roof as a sunroof. The panels can fit between the walls of the panels through slots cut into the edge surfaces at the inner periphery of the associated opening. Sealant and/or cushioning material can be applied at this area to seal the window and prevent rattling. The panels can be free floating or secured by adhesive or fasteners. Also, one or more pivotally mounted window panels can be provided to allow for ventilation.

Additional ventilation can be achieved by holding the door ajar from the door frame using a multi-stage door latch, which also serves to secure the door closed. For example, a rotatable cam member with a spiral-grooved outer periphery can be used to engage a latch member on the door frame so that as the cam member is rotated the door is held more or less open.

Another aspect of the invention provides a plastic resin vehicle cab, with a roof panel and a front panel. The roof and front panels have two walls fused together at some locations and separated at other locations. The front panel defines a windshield opening and a channel or slot extending along the windshield opening. The channel opens to the windshield opening and space between the walls so that peripheral edges of a transparent panel can be captured between the walls.

Another aspect of the invention provides a method of making a plastic door panel for a vehicle cab, as well as a method of making a cab having one or more such door panels. The method includes thermoforming two sheets of plastic resin into a two wall panel that defines a door, a door frame and a door perimeter between the door and the door frame. The walls of the door and door frame are fused together adjacent to the door perimeter for at least a portion of the door perimeter. At least portions of the walls are removed, for example by a cutting operation, along the door perimeter to separate the door from the panel and define a doorway of the door frame. The door is then assembled to the door frame at the doorway. Preferably, hinge knuckles of the door and door frame interleave and hingedly join together with one or more hinge pins. In addition, one or more vehicle contour panels can be mounted to a bottom edge of the door panel, preferably by inserting them into a slot in the door panel and secured by fasteners. Further, a window opening is cut into the door (or door frame) so that a translucent or transparent panel or sheet can be mounted at the opening, preferably by fitting the edges through a slot and between the walls of the door (or door frame).

Thus, the inventor has determined that twin-sheet vacuum thermoforming or blow molding of plastic resin is ideal material and manufacturing process for making a vehicle cab. The plastic material is rugged and can be pre-colored or painted. The twin-sheet vacuum thermoforming are blow molding processes producing a part that provides the required features on both the interior and exterior of the product without additional welding, bonding or assembly of separate pieces to the panels. These processes provide the ability to create plastic panels that can be easily removed or replaced that allow the cab to be easily installed and removed from the vehicle. The cab can be lightweight and yet be very heavy duty given its two wall construction.

The cab can be a monolithic structure, or preferably, a multi-piece assembly. The multi-piece assembly is preferable in many applications as it will pack flat for shipping and storage by both the manufacturer and distributor and the end user. In addition, many more features can be provided in a multi-piece construction because there will not be the restrictive draft angles required for molding a single piece unit. Also, the styling of the finished product is much more flexible in a multi-piece construction, allowing for a much more eye appealing design.

With the multi-piece construction, the components of the cab can be used in their entirety or partially in the following combinations: 1) the front windshield and roof only, using a tubular support on the rear of the roof; 2) the front panel and windshield, roof and rear panel (without door panels); 3) the front panel and windshield, roof, rear panel and door frames (without doors); 4) the front panel & windshield, roof, rear panel, doorframes and doors. Additionally the windows can be made removable from the doors.

The foregoing and other objects and advantages of the invention will appear in the detailed description which follows. In the description, reference is made to the accompanying drawings which illustrate one or more preferred embodiments of the invention.

BRIEF DESCRIPTION OF THE DRAWINGS

FIG. 6 is a broken sectional view taken along line 6-6 of FIG. 3 showing the molded door and door frame prior to the door being cut out;

FIG. 7 is a partial broken sectional view of a door panel with a multi-stage latch handle installed on the door taken along line 7-7 of FIG. 5;

FIG. 8 is a partial cut-away sectional view taken along line 8-8 of FIG. 5 showing the connection of the door panels to the roof panel;

FIG. 9 is an enlarged partial sectional view taken along arc 9-9 of FIG. 8 showing one of the integral snap-locked, tongue and groove connections;

FIG. 12 is side view of a door panel showing a pivotal window;

FIG. 13 is a partial side view of an alternate embodiment of the invention in which the cab includes universally sized panels and vehicle specific contour panels mounted to one or more cab panels to cover space between the cab panels and the vehicle body; and FIG. 14 is partial sectional view taken along line 14-14 of FIG. 13.

DETAILED DESCRIPTION OF THE PREFERRED EMBODIMENTS

As mentioned, the present invention provides an enclosure or cab for a vehicle, such as small motorized tractors, ATVs, golf carts, small construction vehicles, and the like. The cab is made of double walled plastic construction. An HDPE resin is one preferred plastic and twin-sheet vacuum thermoforming or blow molding techniques can be used to mold the resin. The plastic double wall construction makes the cab strong, durable and impact resistant as well as lightweight and easily to install and remove from the vehicle. The double wall construction also has the benefit of allowing multiple features of the cab to be molded at the same time, together in the same panel. For example, the door and door frame of a panel can be formed in one twin-sheet molded panel and then cut apart from each for assembly. This reduces waste of the material and also saves labor, for example in that the cutting operation to remove the door from the panel also defines the doorway within the door frame. The double wall construction has the further advantage of allowing the wall at the interior of the cab to have a different configuration than the exterior wall. Thus, each wall can be molded to define surfaces or specific interior and exterior features without effecting the other wall. Additionally, the cab can be a generally monolithic structure including a roof and one or more upright panels molded integrally with each other, or more preferably, it can be comprised of separate panels making up the roof, front, rear, and sides of the cab. In the latter case, the panels can be self-connecting such that separate fasteners are not required to assemble the cab.

Figure 1:
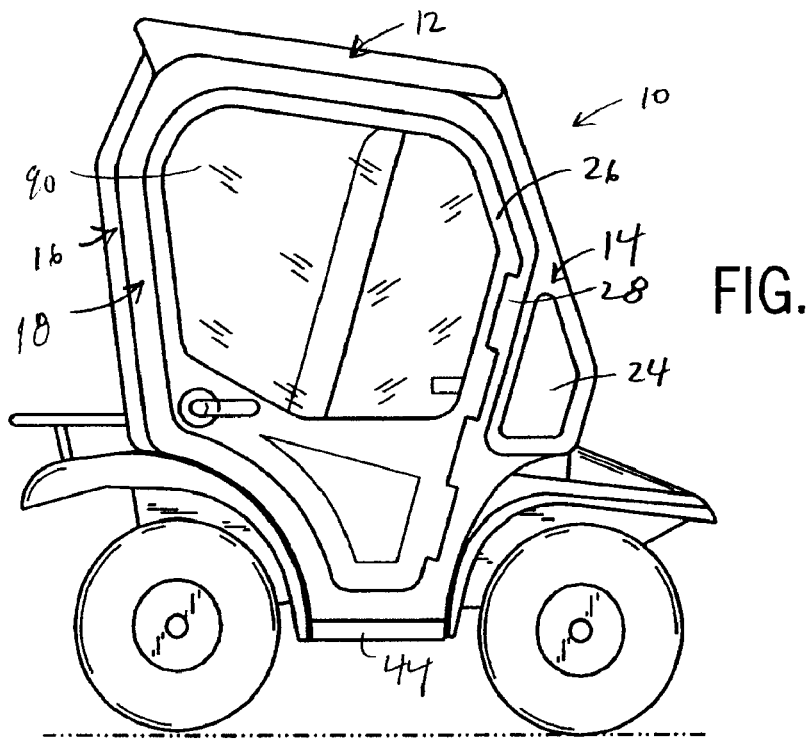
FIG. 1 is a side view of an ATV fitted with a cab according to the present invention.
Figure 2:
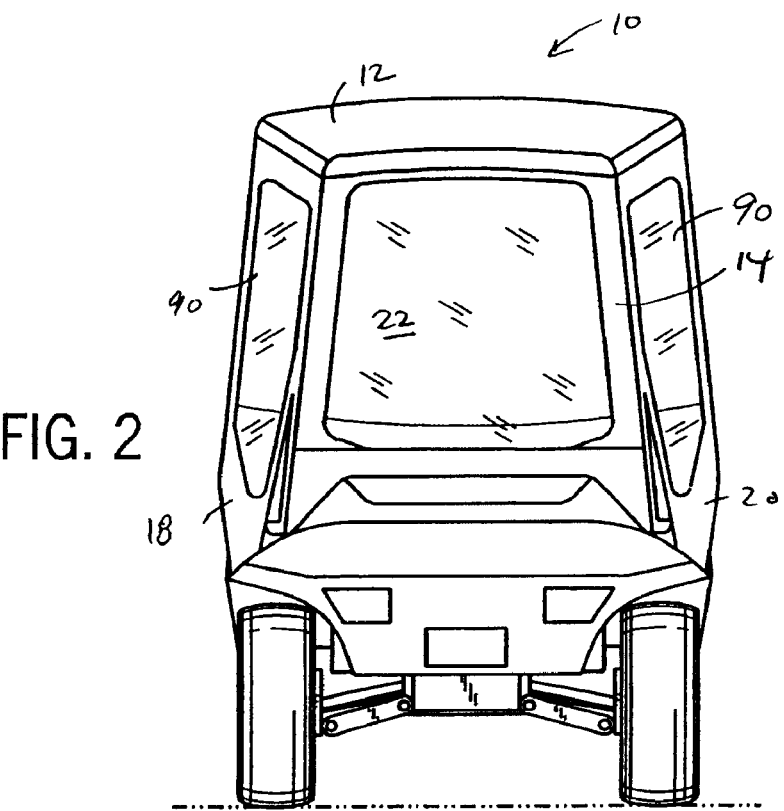
FIG. 2 is a front plan view thereof.
Figure 3:
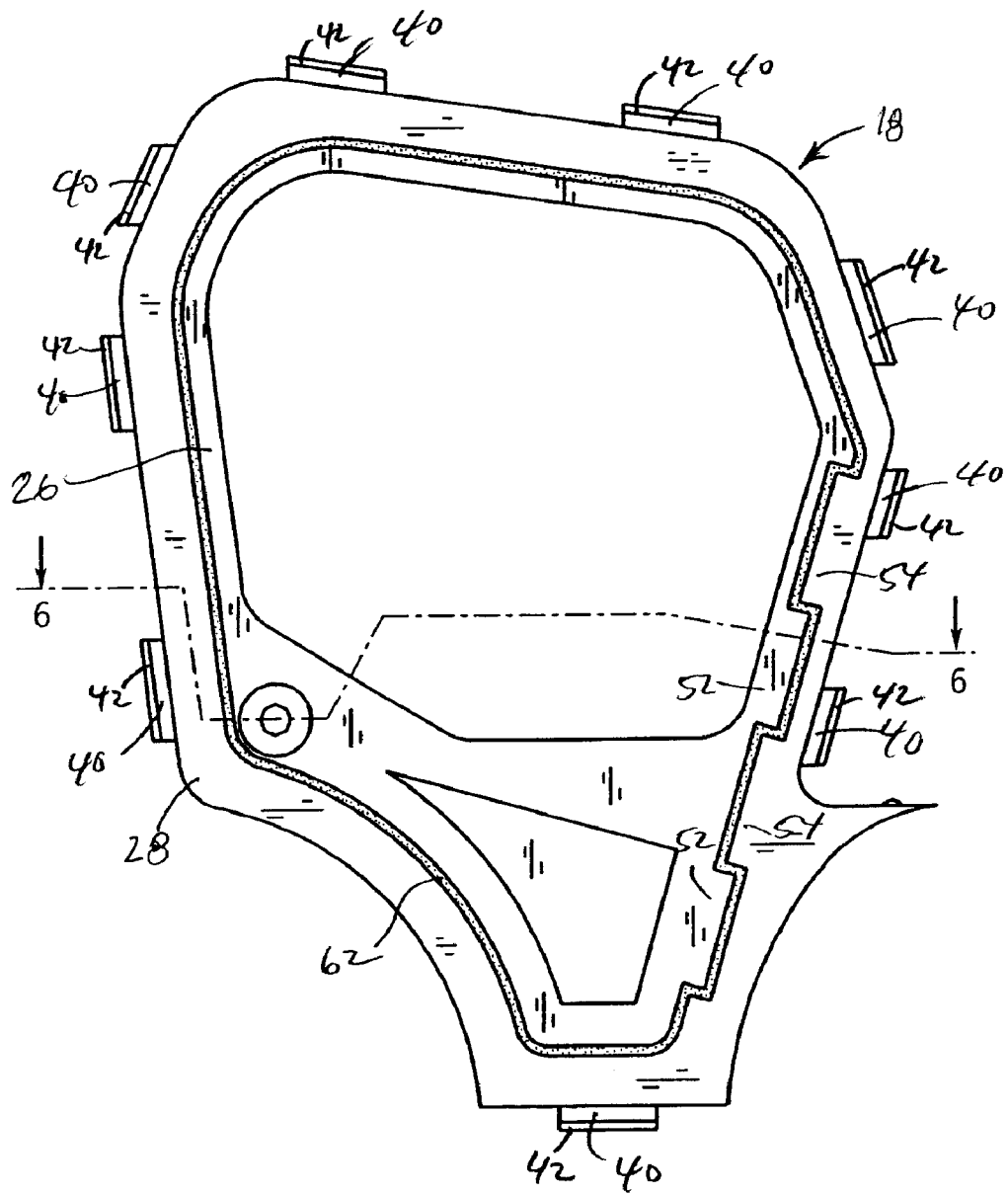
FIG. 3 is a view showing a twin-sheet thermoformed plastic panel door panel of the cab, including a door and a door frame molded integrally in the panel, before a cutting operation along the door perimeter (shown stippled) to separate the door from the door frame.

FIGS. 1 and 2 of the drawings illustrate one preferred version of the cab 10 of the present invention installed on an ATV. This version of the cab 10 is an assembly of roof 12, front 14, rear 16 and side door 18 and 20 panels. Each of these panels will be described in detail below, but generally the front panel includes a see-through windshield 22 and angled side windows 24, the door panels are identical (but mirror images) with a door 26 hinged to a door frame 28 and the rear panel includes a rear window (not shown).

As mentioned, each of these panels is of double walled plastic construction, with the two walls of each panel being primarily spaced apart or separated from one another throughout the panels and fused together at other locations, such as edges or to form specific features. Each of the panels is molded to include one or more integral connection parts that engage a complementary part of one or more adjacent panels, preferably effecting a positive interlock between the panels such that separate fasteners and tools are not required to assemble the panels together. In one form, these connection parts provide tongue and groove snap-locking interconnection, as described below.

With reference to FIGS. 1, 2, 7, 8 and 9 the roof panel 12 is generally flat, but slightly bowed and has long spaced apart channels 30 formed in the outer wall with vertical portions that add strength. A gutter 32 is formed around the outer periphery. The inner wall is molded with pockets 34, which are spaced along all four sides of the roof panel at the margin to the inside of the gutter. Note that a single, four-sided groove could be formed as well. These pockets 34 form a recess including a relief channel 36 and two opposing inwardly dished areas 38. Each of these pockets 34 receives an associated one of several tabs 40 molded integrally in spaced apart relation to project up from the upper edges of each of the upright panels. Each tab has one or more bulges or bosses 42 located and sized to fit into the dished areas 38 of the pockets when the panels are assembled. The bosses are easy to manufacture because they are molded in the line of draw of the mold. The bosses 42 extend outward farther than the width of the pockets so that when the tabs are inserted into the pockets the walls of the pockets or the tabs will deflect slightly until the bosses come to rest inside the dished areas. The narrow walls of the pockets resist separation of the tab and thereby create a snap-lock type connection that positively interlocks the panels. With this arrangement, no tools or separate fasteners are needled to unite the panels. Further, the relief channel 36 in each pocket can accommodate the flange at the tip of the associated tab, which may be molded or trimmed to varying lengths due to the variations in these processes.

Figure 4:
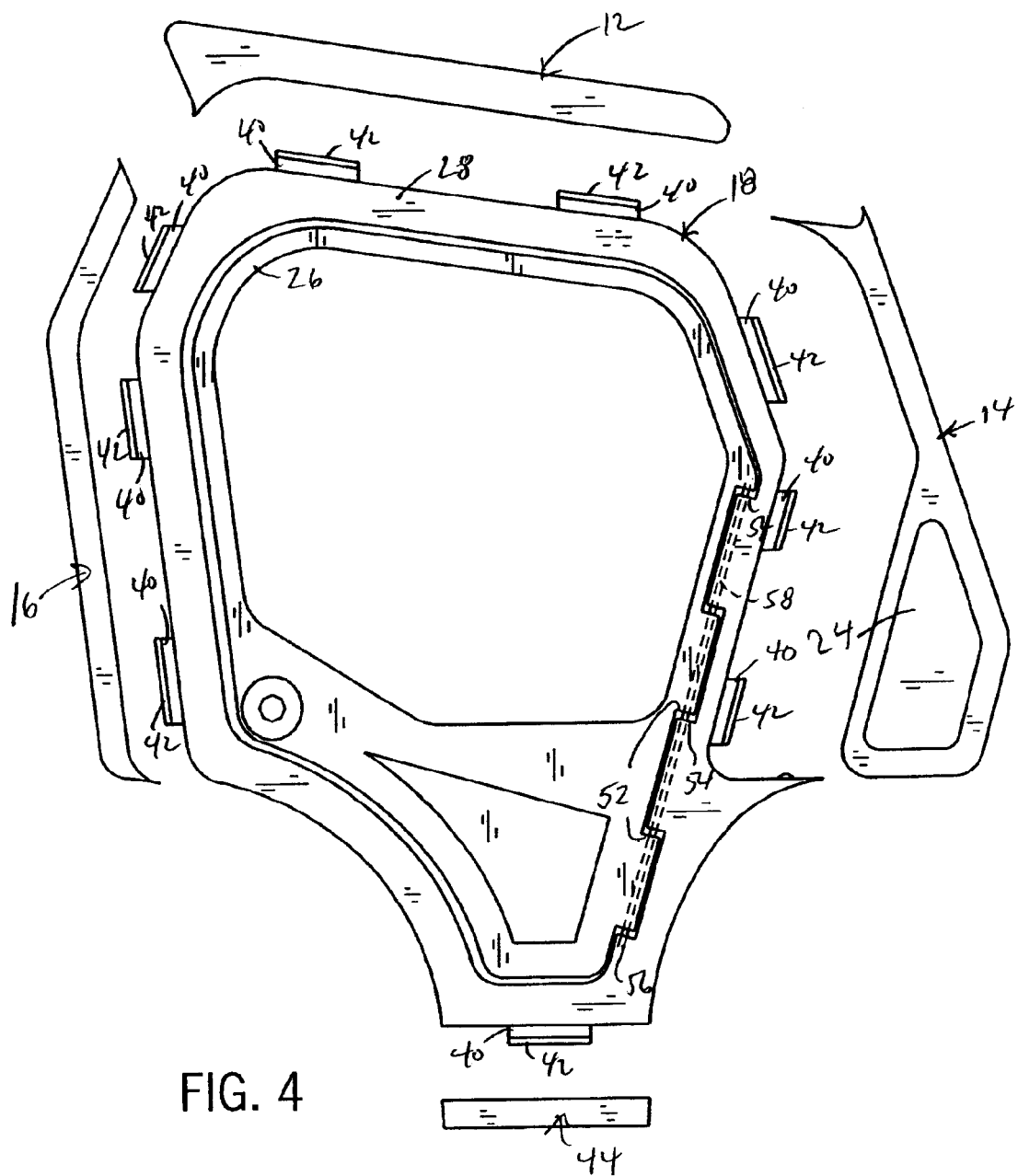
FIG. 4 is a side view of the cab shown with its constituent panels exploded, the door panel is shown without a window.

Each of the panels has similar integrally molded mating connection parts. As shown in FIGS. 4 and 7, the tabs formed with the upright panels are located not just along the top edge but also at or along opposite lateral sides, which allow each upright panel not only to be snapped to the roof but also to the adjacent upright panel, that is the two side door panels interconnect with the front panel at the front of the cab and the rear panel at the rear of the cab. In the preferred version of the cab shown in the drawings, the door panels include tabs projecting out from the lateral edges of the panels that mate with associated pockets formed in the inner walls and at the margins of the front and rear panels. Thus, the tabs project out from the panel edges, straight or angled as needed, to fit into the pockets formed in the front and rear panel (inner wall) faces. Additionally, two optional floor boards 44 can be connected using a similar connection arrangement at the bottom of the door panels.

Thus, the lightweight plastic panels can be readily assembled together to construct the cab. Once assembled, the cab can be easily lifted onto the vehicle. Any suitable method of mounting the cab to the vehicle can be employed, such as bolting the cab to brackets (not shown) mounted to the vehicle frame. Preferably, each upright panel is securely fastened to the vehicle frame at the front, rear and lateral sides of the vehicle.

The cab shown in FIGS. 1 and 2 is designed so that the bottoms of the panels conform to the contours of the vehicle, particularly the body components such as the front and rear fenders. Another, perhaps preferable, manner to fit the cab to a given vehicle is form the upright panels, particularly at the bottom sides, in one or more standard sizes and shapes. Then, one or more vehicle specific contour panels (such as item 46 in FIGS. 13 and 14) can be mounted to the upright panels. In one preferred form, a slot 48 is cut into the bottom edges of the upright panels so that the contour panels can be inserted between the two walls and secured in place by an adhesive or other mechanical fasteners. The contour panel preferably has a bulged section 49 and the slot 48 is preferably not over-sized so that the panels would fit snugly in place. However, sealant and/or cushioning material could be used to reduce relative movement, vibration and rattling. Even more preferably, such contour panels could be molded together with one or more of the cab panels so that additional manufacturing processes are not required. Still further, these contour panels could be molded in locations that would otherwise be waste material, such as in an area were a window opening would be cut out. As an alternative, the contour panels could be separately molded using a semi-flexible polymer material that would conform to the varying contours of the vehicle. The area between the fenders where the operator's feet go may not need a contour panel given the floor boards, and even without them, this area may not need to be sealed tightly since air leakage there is not particularly detrimental, particularly given that there are many open areas surrounding the engine.

Figure 5:
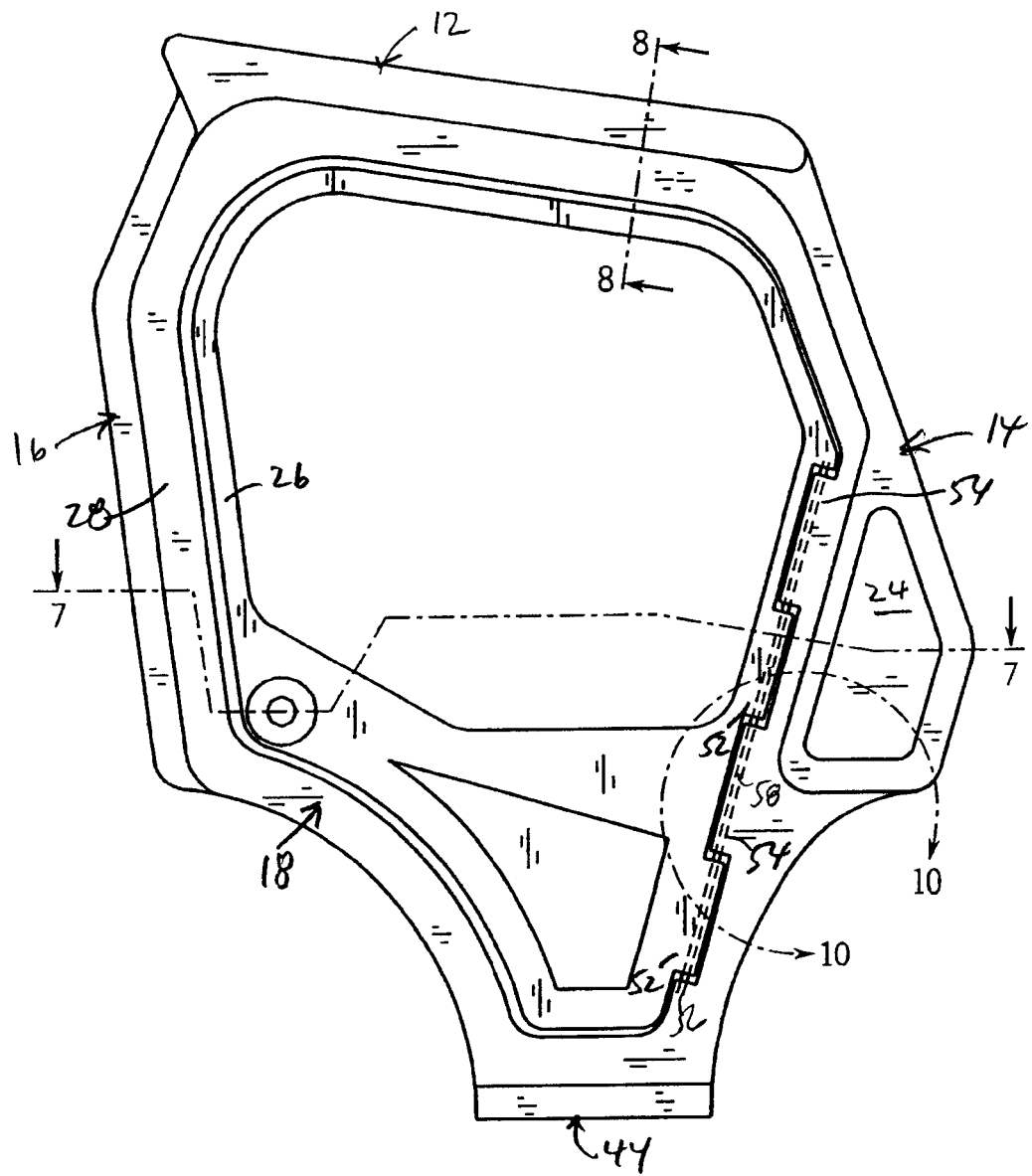
FIG. 5 is a side view showing an assembled door panel with the door hinged to the door frame and the frame connected to the front and rear panels.
Figure 10:
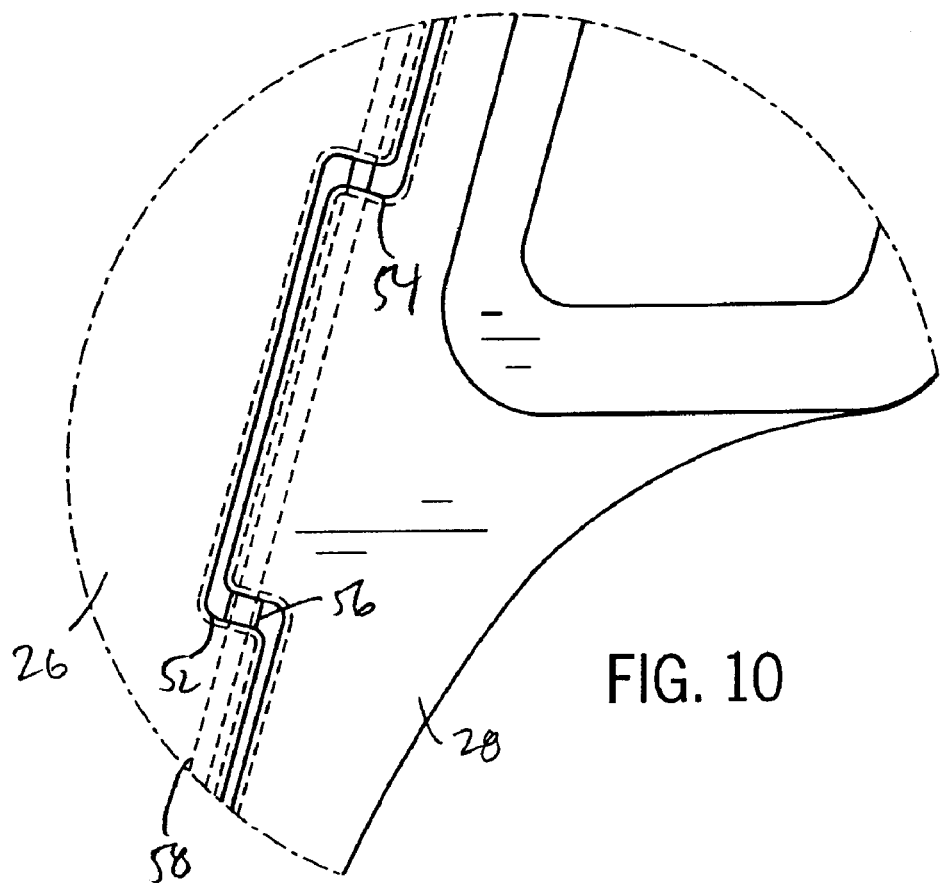
FIG. 10 is a partial enlarged view taken along arc 10-10 of FIG. 5, showing a portion of the door panel hinge.

As mentioned above and shown in FIGS. 5, 7 and 10, the door panels each include a door frame to which is pivotally mounted a door over a doorway 50. The door and door frame each have respective hinge knuckles 52 and 54 at hinge sides thereof that are spaced apart and offset in opposition to the other so that the knuckles can be interleaved in aligned along a hinge axis 56 of a long hinge pin 58 that joins the door to the door frame. As shown in FIG. 7, the door preferably overlaps the door frame (at the doorway) along at least the free side of the door opposite the hinge, and preferably along all non-hinge sides. This reduces air gaps around the door and also provides a positive stop that prevents the door from swinging to the interior of the cab. A gap filler strip 60 can be mounted to the hinge side of the door or the door frame to cover the air gap between the hinge knuckles. Preferably, this strip is taken from a waste area of the molded panels, however, it may be a separate gasket or seal member.

According to one preferred technique, FIG. 4 of the drawings shows one of the door panels in its post-molded and pre-cut state in which the door and door frame, including the hinge knuckles, are formed from the same twin-sheet panel and not yet cut apart. The door and door frame portions of the molded panel are separated by a door perimeter 62, which essentially outlines the door, thereby defining the outer periphery of the door and the inner periphery of the door frame. Notably, the door is formed inside the door frame in what becomes the doorway. Thus, in the process of cutting out the door, the doorway is simultaneously formed, thereby reducing both wasted and manufacturing efforts. As best seen in FIGS. 6 and 7, the two walls of the molded panel are fused together at both sides of the door perimeter, in this case, along the entire periphery of the door and door frame so that each part has a closed edge when separated. And, preferably the two walls are separated (not fused together) along at least a portion of the door perimeter. Ideally, the door perimeter has non-fused walls along all non-hinge sides of the door so that an overlap is created along these sides, as will be described. However, an overlap on the free side of the door (opposite the hinge) only would be sufficient. Note also that the two walls could be fused along the entire door perimeter, however, then there would be no integral overlapping surfaces between the door and door frame. In this case a separate seal and/or door stop could be added.

FIG. 6 shows one exemplary configuration of the door perimeter in which two bumps outs 70 and 72 are formed, one in each wall and extending in opposite directions, along the non-hinge sides of the door, with the bump out 70 on the inner wall being inside bump out 72. The door is cut from the door panel using any suitable technique such as hot knife or routing. Each bump out can be cut for example along the cut lines marked in FIG. 6 or they can be routed off completely, taking care not to cut through both walls simultaneously. The cutting operation is performed along the hinge side as well, however, here the walls are fused together so that both walls are cut simultaneously. After the cutting operation, the door can be separated from the door frame, with the resulting opening being the doorway. Additional trimming or edge finishing may be desired to make clean edges on both parts. While not shown, other ribs or bumps can be molded along the door perimeter (and in the door and door frame) to add strength.

With the door separated, holes are drilled into the hinge knuckles of both parts and the door is hinged to the door frame by interleaving the hinge knuckles and sliding the hinge through the holes through another hole at the top or bottom of the door frame. The hinge pin can be a long polyethylene rod or tube, and a spacer (not shown) may be used on the hinge pin between the knuckles to align the door. Since material was removed from the hinge side of the door perimeter, the door will shift slightly (from its molded position) toward the hinge side after being mounted to the door frame. The described above overlap accommodates this so that there are no air gaps around the door. Moreover, the filler strip covers the gaps at the hinge side.

Figure 11:
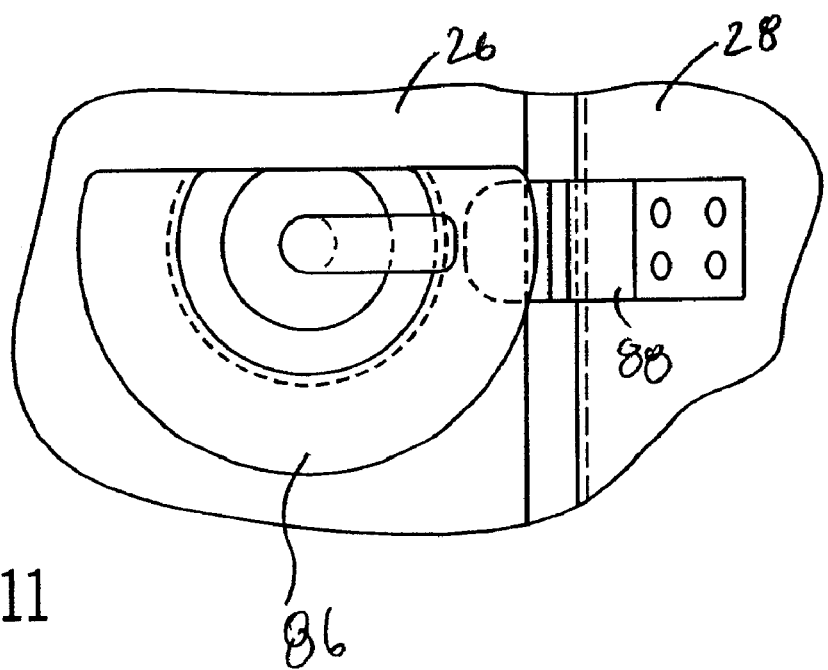
FIG. 11 is a partial rear plan view take from line 11-11 of FIG. 7 showing a multi-stage door latch.

As shown in FIGS. 7 and 11, the door is held closed against the door frame by a multi-stage latch 86 mounted on a pin passing through the door and having handles at each side. The latch is a tapered cam member with a peripheral groove that engages a fixed catch 88 mounted to the door frame. When the latch is rotated fully in one direction the cam will clear the catch so that the door can be opened. The special latch also allows the door to be held in various ajar positions to ventilate the cab, which may be necessary given that the operator is sharing space in the cab with the hot engine. The taper on the cam allows the latch to change the space between the door and the door frame as it is rotated.

All of the panels can have some type of see-through and/or ventable panel. As already mentioned, the front panel can have the windshield 22 and angled side windows 24 and the rear panel has a rear window (not shown). The roof can have a translucent panel (not shown) to provide a sun-roof and the doors can have windows 90. Extruded acrylic sheets can be used for the window panels, particularly given that material's light weight, durability and ease to fabricate, however, it is somewhat susceptible to being scratched. A thicker glazing or safety glass is preferable for the windshield. Preferably, the edges of the panels for the windshield and other windows are slipped in between the walls of the cab panels through slots located in the inner edges of cut out window openings. The slots can be cut higher at the upper side of the openings to facilitate installation, and preferably the materials will allow for distortion to fit side to side. To keep the windows from vibrating and snug a cushioning material may be placed inside the slots. Window rests and stops can also be molded into the cab panels to constrain the windows laterally and vertically.

As shown in FIG. 12, the door panel windows preferably have a movable window pane to provide ventilation. In the form shown in the drawings, this is accomplished by splitting the window into two components, a rear part 100 would be mounted and fixed, as described above, and the front part 102 would pivot on a pin and rotate rearward over the inside of the rear part. The door is molded to allow for clearance of the components and a radius on the top of the side window is designed to allow for the pivoting action. There will be an area on the front/top panel that a wiper mechanism can be mounted to.

As an alternative, the side (or any) windows could be zippered in place with a double-ended zipper. This would facilitate ventilation by allowing the front or rear portion of the window to be open. Additionally the entire window could be removed in the field, and if a flexible material is used, rolled up and placed in a pocket that was molded into one of the panels to receive it.

A vehicle cab that is made by either a twin sheet vacuum thermoforming process or a blow molding process has been described in considerable detail. The features described enable a hollow walled plastic molded construction that is uniquely adapted to provide a vehicle cab for an ATV, small tractor and construction related equipment applications. Many modifications and variations to the preferred embodiments described will be apparent to a person of ordinary skill in the art. Therefore, the invention should not be limited to the embodiment described.

The invention claimed is:

1. A plastic door panel for a vehicle cab, the door panel comprising a first wall and a second wall fused together in some locations and separated from each other in other locations, wherein the first and second walls define a door, a door frame and a door perimeter between the door and the door frame, wherein the door has a hinge side defining a plurality of spaced apart hinge knuckles and wherein the door frame has a hinge side defining a plurality of spaced apart hinge knuckles arranged offset from and in opposition to the hinge knuckles of the door, wherein the door can be removed from the door panel by removing at least portions of the first and second walls along the door perimeter to define a doorway, and wherein the door can be mounted to the door frame at the doorway with the hinge knuckles of the door and door frame arranged in alternating fashion along a hinge axis, wherein at least a portion of the first and second walls of the door are fused together adjacent to the door perimeter and at least a portion of the first and second walls of the door frame are fused together adjacent to the door perimeter, and wherein the first wall is separated from the second wall along at least a portion of the door perimeter.

2. The door panel of claim 1, wherein the first wall is separated from the second wall at least along a free side of the door opposite its hinge side, and wherein when the door is separated from the door panel, the first wall is separated from the door panel at the free side of the door farther from the hinge side of the door than where the second wall is separated at the free side of the door to form an overlap at the door and door frame and the free side of the door.

\* \* \* \* \*